(12) United States Patent
Mizuta et al.

(10) Patent No.: US 6,394,555 B2
(45) Date of Patent: May 28, 2002

(54) FOUR-WHEELED UTILITY VEHICLE

(75) Inventors: Fumio Mizuta, Akashi; Sosuke Kinouchi, Kakogawa; Itsuo Takegami, Kobe, all of (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 09/740,061

(22) Filed: Dec. 20, 2000

(30) Foreign Application Priority Data

Dec. 27, 1999 (JP) ........................................... 11-370345

(51) Int. Cl.⁷ ................................. B60P 1/00; B60J 7/00
(52) U.S. Cl. ........................ 298/38; 298/17 R; 298/10; 296/184
(58) Field of Search ................................ 298/38, 17 R, 298/7; 280/781, 405.1, DIG. 5; 296/184, 26.03, 183, 57.1, 265

(56) References Cited

U.S. PATENT DOCUMENTS

| | | | | |
|---|---|---|---|---|
| 1,584,645 A | * | 5/1926 | Prosser | 298/17 R |
| 1,662,653 A | * | 3/1928 | Young et al. | 298/38 |
| 1,965,476 A | * | 7/1934 | Smith | 298/38 |
| RE22,955 E | * | 12/1947 | Penney | 298/38 |
| 4,417,765 A | * | 11/1983 | Wirsbinski | 298/38 |
| 4,706,770 A | * | 11/1987 | Simon | 280/405.1 |
| 4,773,675 A | * | 9/1988 | Kosuge | 280/781 |
| 4,807,904 A | * | 2/1989 | Kamlukin et al. | 298/38 |
| 4,881,610 A | * | 11/1989 | Kosuge | 123/41.48 |
| 5,086,858 A | * | 2/1992 | Mizuta et al. | 123/41.56 |
| 5,429,290 A | * | 7/1995 | Greene, Jr. | 280/DIG. 5 |
| 5,975,226 A | * | 11/1999 | Matsumoto et al. | 180/9.1 |
| 6,048,018 A | * | 4/2000 | Shambeau et al. | 296/26.03 |
| 2001/0000641 A1 | * | 5/2001 | Dombk et al. | 298/7 |
| 2001/0004950 A1 | * | 6/2001 | Mizuta | 180/69.2 |
| 2001/0007396 A1 | * | 7/2001 | Mizuta | 296/183 |
| 2001/0024046 A1 | * | 9/2001 | Mizuta | 296/57.1 |
| 2001/0054832 A1 | * | 12/2001 | Mizuta | 296/205 |

FOREIGN PATENT DOCUMENTS

JP 63-202579 12/1988

* cited by examiner

*Primary Examiner*—Ken Patel
(74) *Attorney, Agent, or Firm*—Oliff & Berridge PLC

(57) ABSTRACT

A four-wheeled utility vehicle has a body frame; a driver's seat disposed on the body frame; a load-carrying platform having a front end portion and a rear end portion, the load-carrying platform disposed behind the driver's seat; a cabin frame having a rear portion and surrounding the driver's seat. The cabin frame is disposed in front of the load-carrying platform. The rear portion includes a lower end which is positioned on a level below the load-carrying platform and a middle portion which is located on a middle level in a vertical direction within the rear portion. The lower end of the rear portion is joined to the body frame. The middle portion of the rear portion is bound by the front end portion of the load-carrying platform in an easily separable manner.

6 Claims, 5 Drawing Sheets

FOUR-WHEELED UTILITY VEHICLE

BACKGROUND OF THE INVENTION

1. Field of the Invention

The present invention relates to a four-wheeled utility vehicle suitable for carrying goods in outdoor spaces or in wide indoor spaces and provided with a cabin frame (also called as a cab frame) surrounding a driver's seat.

2. Description of the Related Art

Referring to FIGS. 6A and 6B showing a four-wheeled utility vehicle disclosed in Japanese Utility Model Publication No. Shou 63-202579, The four-wheeled utility vehicle has a body frame 10, four wheels, i.e., two front wheels 2 and two rear wheels 3, suspended from the body frame 10, a driving unit, such as an engine, mounted on the body frame 10, a driver's seat 4 and a load-carrying platform 30'. The four-wheeled utility vehicle is often provided with wide tires suitable for traveling on rough roads.

A cabin frame 20' is formed in front of the load-carrying platform 30' so as to surround the driver's seat 4. The cabin frame 20' has front and rear portions 21', 22' including vertical members and horizontal members which are extended between the vertical members. The front, rear, right and left sides of the driver's seat 4 is surrounded by the cabin frame 20'. The cabin frame 20' is formed by assembling steel pipes or the like so as to protect the driver. A roof or a hood, not shown, can be attached to the cabin frame 20' to screen the driver's seat 4 from rain and sunshine, and lighting devices 7 can be attached to the cabin frame 20' for illumination to facilitate work at night.

As shown in FIG. 6B, lower end portions of the front portion 21' of the cabin frame 20' are held on a front part of the body frame 10 by joints 23' fastened to the body frame 10 with bolts. Lower end portions of the rear portion 22' of the cabin frame 20' are held on an upper part of the load-carrying platform 30' by joints 26' fastened to the load-carrying platform 30' with bolts.

The above-mentioned four-wheeled utility vehicle has the following problems.

a) The joints 26' holding the lower end portions of the rear portion 22' are fastened to the upper part of the load-carrying platform 30'. Therefore, it is difficult to lift or tilt the load-carrying platform 30' or to remove the load-carrying platform 30' from the body frame 10. Work for unloading the load-carrying platform 30' and work for the maintenance of mechanical devices including the engine provided under the load-carrying platform are facilitated if the load-carrying platform 30' can be tilted by lifting the front part thereof or can be removed easily from the body frame 10. However, when those components of the cabin frame 20' are held by the joints 26' fastened to load-carrying platform 30', the cabin frame 20' must be separated from the joints 26' before lifting or removing the load-carrying platform 30', which takes considerable time and labor.

b) On the other hand, if the lower end portions of the rear portion 22' of the cabin frame 20' are joined to the body frame 10 which is underlying the load-carrying platform 30', the load-carrying platform 30' can be relatively easily lifted or removed. However, the length of the rear portion 22' must be increased to join the lower end portions of the rear portion 22' to the body frame 10. As a result, the rear portion 22' should be formed by bigger pipes or pipes having bigger wall thickness to ensure a sufficient rigidity to the rear portion 22'. Therefore, the weight of the cabin frame 20' will considerably increase. To enable the cabin frame 20' to withstand an external back-and-forth force acting on the upper end of the cabin frame 20', most part of the moment must be born by the joints joining the lower end portions of the rear portion 22' and the body frame 10. Therefore, the joints must be built very strong, and the rear portion 22' of the cabin frame 20' must be formed from thick, strong pipes or the like. As a result, the cabin frame will become considerably heavy. The rigidity of the cabin frame 20' can be enhanced by extending guardrails 4a from the rear portion 22' as shown in FIG. 6B and joining the guardrails 4a to the body frame 10. However, the weight of the cabin frame 20' will increase. Moreover, the guardrails 4a obstruct the driver's getting on and off the utility vehicle.

SUMMARY OF THE INVENTION

The present invention has been made to solve such problems and it is therefore an object of the present invention to provide a four-wheeled utility vehicle provided with a rigid, lightweight cabin frame capable of facilitating tilting a load-carrying platform of the four-wheeled utility vehicle.

According to the present invention, a four-wheeled utility vehicle has: a body frame; a driver's seat disposed on the body frame; a load-carrying platform having a front end portion and a rear end portion, the load-carrying platform being disposed behind the driver's seat; a cabin frame having a rear portion and surrounding the driver's seat, the cabin frame being disposed in front of the load-carrying platform, the rear portion of the cabin frame including a lower end which is positioned on a level below the load-carrying platform and a middle portion which is located on a middle level in a vertical direction within the rear portion, the lower end of the rear portion being joined to the body frame, and the middle portion of the rear portion being bound by the front end portion of the load-carrying platform in an easily separable manner.

Unless otherwise specified, the words "front", "rear", "right", "left" are used herein to signify position or direction with respect to the direction of forward travel of the four-wheeled utility vehicle, and the words "lateral", "back-and-forth", "vertical" and "horizontal" are not used in strict sense and is used to signify substantially lateral, substantially back-and-forth, substantially vertical and substantially horizontal. The phrase "(be bound) in an easily separable manner" signifies that the cabin frame is bound by the load-carrying platform such that the cabin frame can be easily disconnected from the load-carrying platform without practically impairing the tilting ability of the load-carrying platform.

Since the lower end portions of the rear portion of the cabin frame are not fastened to the load-carrying platform, the load-carrying platform of the four-wheeled utility vehicle can be turned upward and downward (tilted). The load-carrying platform can be easily and quickly turned upward and downward by hand or a mechanical device only if the middle portion of the rear portion of the cabin frame is released from the load-carrying platform without requiring work for unfastening a joint and removing the cabin frame. The tiltable load-carrying platform facilitates work for unloading the load-carrying platform or work for the maintenance of mechanical devices underlying the load-carrying platform.

Since the lower end of the rear portion of the cabin frame is joined to the body frame and the middle portion of the same is bound by the load-carrying platforms, the cabin frame is rigid and is able to withstand load exerted thereon. A large moment exerted on the rear portion by the load is counterbalanced by reaction forces produced in the middle portion bound by the load-carrying platform and the lower end joined to the body frame. Since the middle portion and the lower end of the rear portion can be spaced a sufficiently great distance apart, reaction forces at the middle portion and the lower end of the rear portion are not excessively high. Therefore, stresses are induced in the rear portion of the cabin frame in a mode quite different from that in which stresses are induced in the rear portion of the cabin frame of the known four-wheeled utility vehicle that bears the moment only by the lower end of the rear portion. Although the forces exerted on the cabin frame are transmitted to the load-carrying platform, any problem does not arise because the load-carrying platform is firmly supported on the body frame. For example, the load-carrying platform is supported by support means including pivotal member on which the load-carrying platform is turned for tilting.

The rigidity of the cabin frame is enhanced since the middle portion of the rear portion is bound by the load-carrying platform. Therefore, an increase in the weight of the cabin frame can be limited to the least necessary extent. The middle portion of the rear portion of the cabin frame can be bound by the load-carrying platform with only an additional small part because the rear portion of the cabin frame is very close to the load-carrying platform. The joint of the lower end of the rear portion and the body frame do not need to be very strong. The rear portion does not need to be formed from very strong materials, such as thick pipes. Consequently, the cabin frame can be formed in a lightweight structure. An increase in weight of the cabin frame due to the binding of the middle portion of the rear portion thereof by the load-carrying platform is smaller than that due to the connection of the rear portion to the body frame by guardrails or the like. The cabin frame does not obstruct driver's getting on and off the utility vehicle.

Preferably, the rear portion of the cabin frame has a plurality of vertical members and a horizontal crossbar by which the vertical members are connected. The load-carrying platform can be turned such that the front end portion of the load-carrying platform is raised relative to the rear end portion of the load-carrying platform. The load-carrying platform is provided with a hooking member at the front end portion of the load-carrying platform, the hooking member having an eye opening which is opened downward. The rear portion of the cabin frame is restrained from free movement by the hooking member which is hooked over the crossbar when the front end portion of the load-carrying platform is placed at its normal position.

The load-carrying platform of the four-wheeled utility vehicle can be tilted by lifting up the front end portion thereof. Therefore, the load-carrying platform can he easily unloaded. Work for the maintenance of the mechanical devices underlying the load-carrying platform is facilitated.

The rear portion of the cabin frame can be bound by the load-carrying platform by bringing the hooking member from above into engagement with the crossbar. Therefore, the hooking member can be disengaged from the crossbar simply by raising the front end portion of the load-carrying platform and be brought into engagement with the crossbar simply by lowering the front end portion of the load-carrying platform. Any special operation is not necessary at all for disengaging the hooking member from and engaging the same with the crossbar. Once the hooking member is engaged with the crossbar, the crossbar is surely restrained by the hooking member from free movement in all directions excluding movements in a downward and a lateral directions.

The crossbar can be effectively used when the same is attached to the vertical members of the rear portion of the cabin frame and the hooking members attached to the front end of the load-carrying platform are brought into engagement with the crossbar. The load-carrying platform is a rigid structure formed by attaching side walls and end walls to a deck, the cabin frame is formed by assembling rods or pipes, such as steel pipes, so as to surround the driver's seat. The rigidity of the cabin frame can be effectively enhanced by the crossbar. Since the conventional cabin frame is provided with a crossbar on its rear members, any special crossbar does not need to be attached to the conventional cabin frame when incorporating the present invention into the conventional cabin frame.

Preferably, the load-carrying platform having a pair of the hooking members which are attached to right and left end portions of the front end portion of the load-carrying platform, respectively.

The hooking members attached to the right and the left end portion of the front end of the load-carrying platform are able to exercise a function of binding the crossbar by the load-carrying platform more effectively. The load-carrying platform has the side walls placed on the right and the left side of the deck, and the front and the rear end of the deck, respectively, to define a space for containing cargo. The opposite ends of the front end wall is joined to the front ends of the right and the left side wall. Therefore, the front right and the front left end portion of the load-carrying platform is more rigid than a middle portion of the front end of the load-carrying platform. Generally, the vertical members of the rear portion are disposed at the right and the left end of the rear portion of the cabin frame and hence the crossbar is joined to the vertical members at positions near the right and the left side of the body frame. Therefore, opposite end portions of the crossbar are rigid and are more difficult to deform than a middle portion of the same. Thus, the hooking members attached to the front right and the front left end portion of the load-carrying platform are able to bind the cross bar securely to prevent the deformation of the cabin frame effectively.

Preferably, a small clearance is formed between an outer surface of the crossbar and a periphery of the eye opening when the front end portion of the load-carrying platform is placed at the normal position.

Since the clearance is formed between the crossbar and the hooking member when the front end of the load-carrying platform is placed at the normal position, the load-carrying platform can be smoothly lifted up and lowered. It is possible that the crossbar and the hooking member touch each other and noise is generated because the cabin frame and the load-carrying platform vibrate while the four-wheeled utility vehicle is traveling. Noise generation can be prevented by increasing the size of the clearance to an extent that the crossbar and the hooking member do not touch each other due to vibration of the crossbar and the hooking member.

The clearance between the cross bar and the hooking member is small enough to make the hooking member attached to the load-carrying platform to exercise effectively their function to bind the crossbar attached to the cabin frame when the cabin frame is loaded. In other words, when the cabin frame is deformed elastically, the crossbar touches the hooking member and is restrained from further movement relative to the hooking member. Therefore, plastic deformation of the cabin frame can be prevented.

Preferably, a cushioning member is interposed between the crossbar and the hooking member. The generation of noise can be prevented by the cushioning member.

Preferably, the load-carrying platform is provided with a horizontal bar at the front end portion of the load-carrying platform. The load-carrying platform can be turned such that the front end portion of the load-carrying platform is raised relative to the rear end portion of the load-carrying platform. The cabin frame is provided with a hooking member at the rear portion of the cabin frame, the hooking member having an eye opening which is opened upward. The rear portion of the cabin frame is restrained from free movement by the horizontal bar with which the hooking member is engaged when the front end portion of the load-carrying platform is placed at its normal position.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
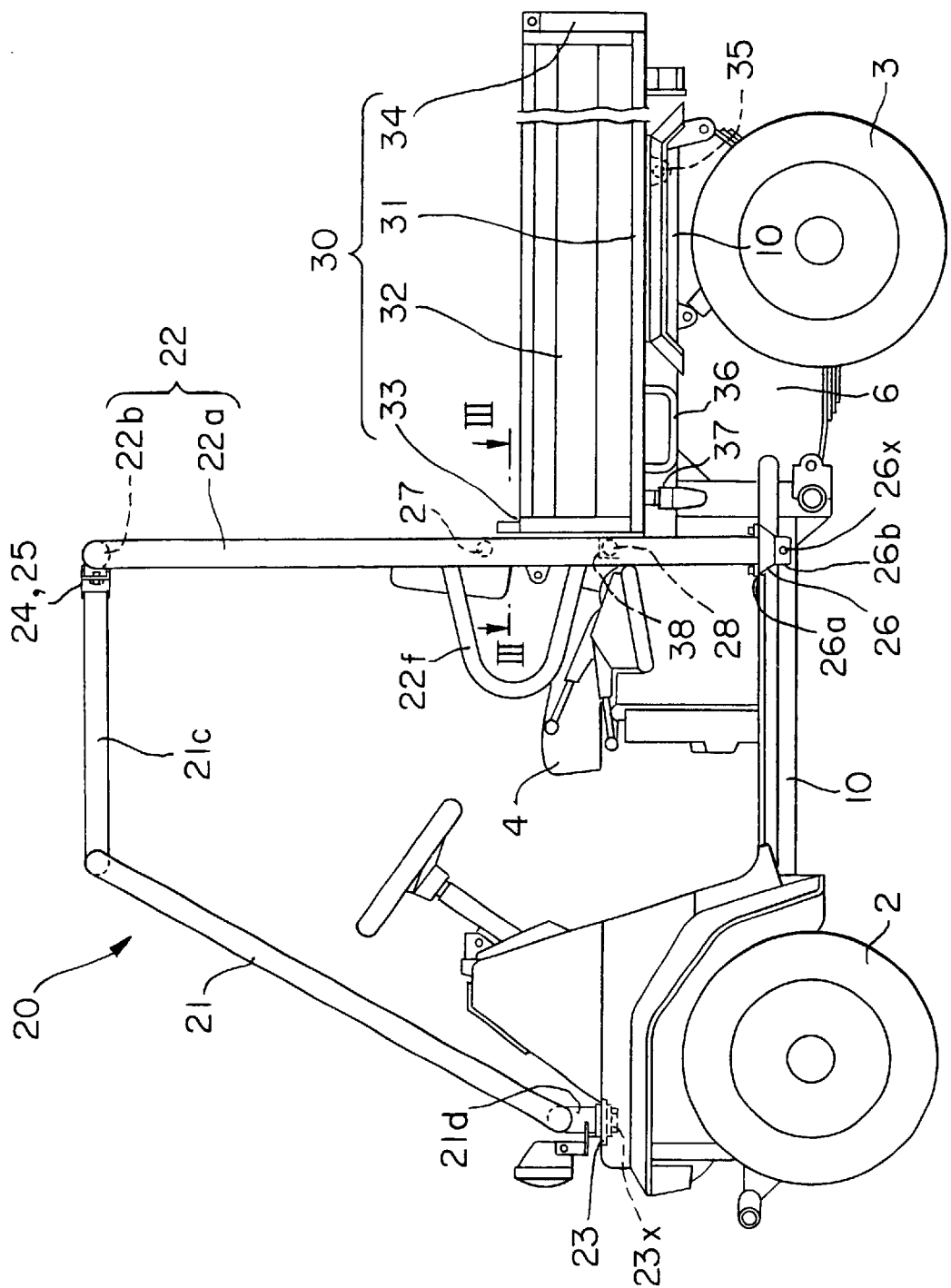
FIG. 1 is a side elevation of a four-wheeled utility vehicle in a preferred embodiment according to the present invention.
Figure 2:
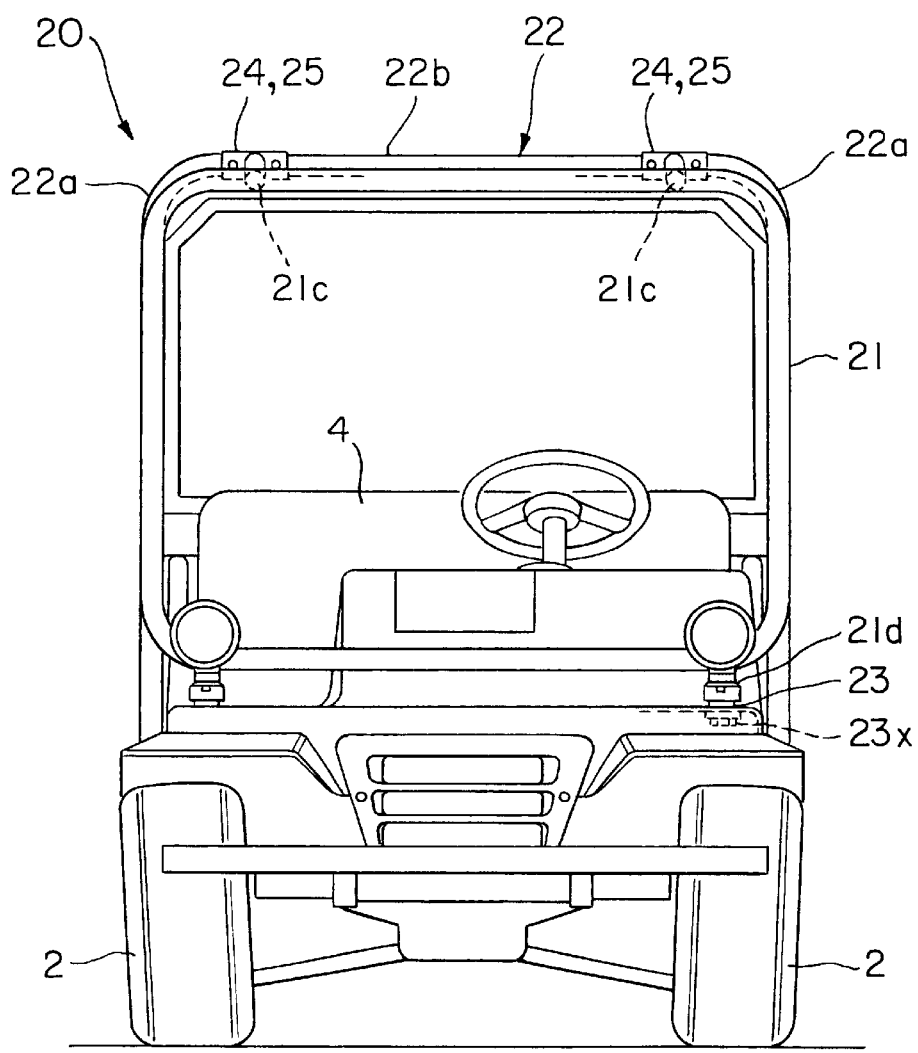
FIG. 2 is a front elevation of the four-wheeled utility vehicle shown in FIG. 1.

As shown in FIGS. 1 and 2, a four-wheeled utility vehicle in a preferred embodiment has a steel body frame 10, two front wheels 2 and two rear wheels 3, i.e., four wheels in all, a driver's seat 4, a cabin frame 20 and a load-carrying platform 30. The front wheels 2 and the rear wheels 3 are suspended from front and rear portions, respectively, of the body frame 10. The driver's seat 4, the cabin frame 20 and the load-carrying platform 30 are mounted on the body frame 10. The driver's seat 4 is disposed behind the front wheels 2. The load-carrying platform 30 is disposed behind the driver's seat 4 so as to extend rearward from a position near the driver's seat 4 over the rear wheels 3. The cabin frame 20 is disposed in a region between a front portion of the body frame 10 and a portion of the body frame 10 behind the driver's seat 4, i.e., a portion of the body frame 10 in front of the load-carrying platform 30, so as to cover the driver's seat 4. A driving system including an engine, not shown, is placed in a space 6 under the load-carrying platform 30. The driving system drives the rear wheels 3 or both of the front wheels 2 and the rear wheels 3 for traveling. The wheels 2 and 3 are provided with wide tires to enable the four-wheeled utility vehicle to travel on rough roads. A roof or a hood can be attached to the cabin frame 20 to protect the driver and to screen the driver's seat 4 from rain and sunshine, and lighting devices can be attached to the cabin frame 20 for illumination to facilitate work at night.

Figure 6A:
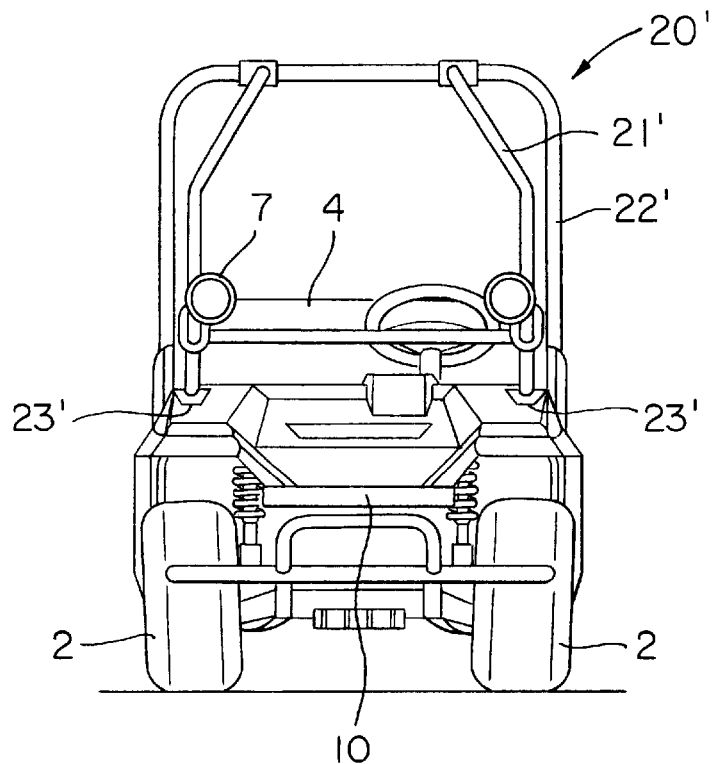
FIGS. 6A and 6B are front elevation and a side elevation, respectively, of a conventional four-wheeled utility vehicle.
Figure 6B:
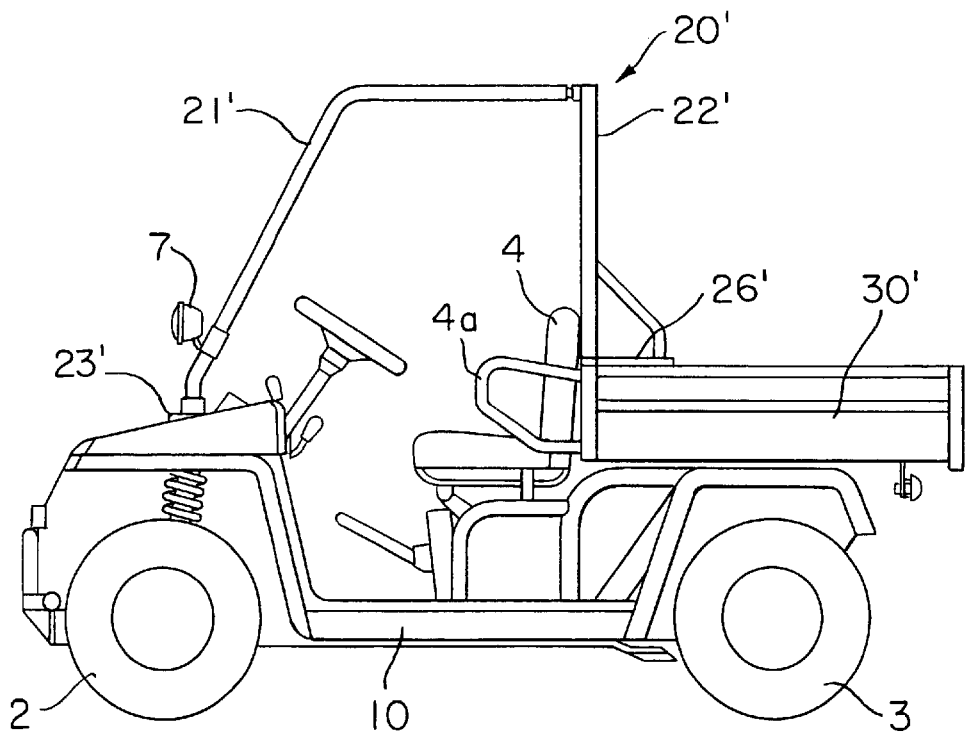

The four-wheeled utility vehicle of the present embodiment is substantially similar in basic construction to the conventional four-wheeled utility vehicle as shown in FIGS. 6A and 6B. The cabin frame 20 and the load-carrying platform 30 of the four-wheeled utility vehicle of the present embodiment and the relation between those are different from those of the conventional four-wheeled utility vehicle. Hereinafter, the four-wheeled utility vehicle of the present embodiment will be described mainly in terms of the construction of the cabin frame 20 and the load-carrying platform 30.

Referring to FIG. 1, the cabin frame 20 has a front portion 21 and a rear portion 22 formed by properly bending steel pipes having a circular cross section and welding together the properly bent steel pipes. The cabin frame 20 is formed by joining the front portion 21 and the rear portion 22 by joints 24 and 25. As shown in FIG. 2, the front portion has a rectangular frame formed by bending a steel pipe, two legs 21d joined to a lower section of the rectangular frame, and feet 23 attached to the lower ends of the legs 21d. The feet 23 are fastened to the body frame 10 with bolts 23x. Two upper pipes 21c are extended rearward from right and left end portions of an upper section of the rectangular frame. The rear ends of the upper pipes 21c are connected to an upper section 22b of the rear portion 22 with the joints 24 and 25 and bolts.

Figure 3:
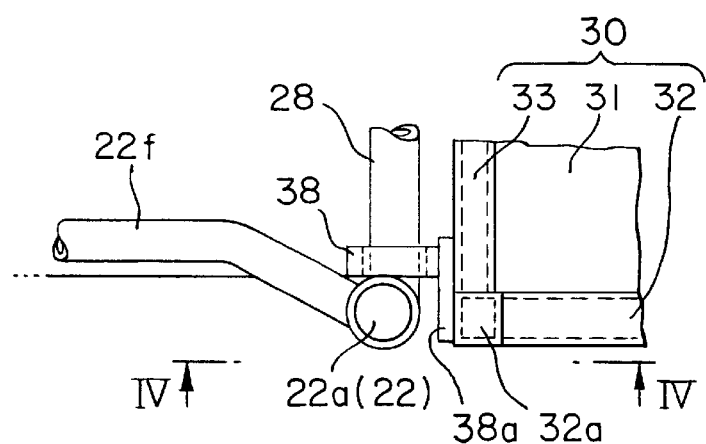
FIG. 3 is a top view of a crossbar, a hooking member and circumference thereof taken in the direction of the arrows on the III—III in FIG. 1.
Figure 4:
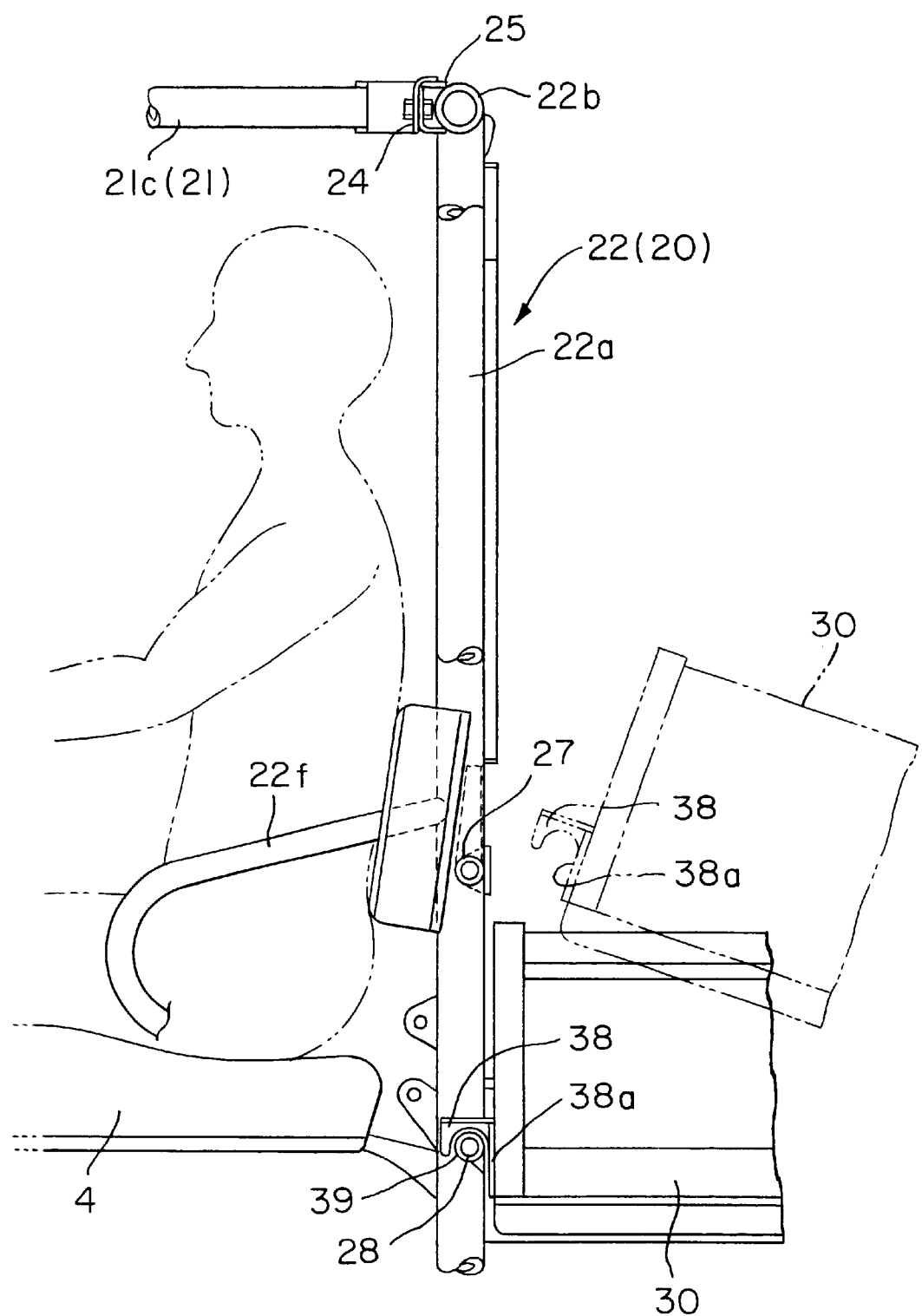
FIG. 4 is a side elevation of the cross bar, the hooking member and circumference thereof taken in the direction of the arrows on the line IV—IV in FIG. 3.

The rear portion 22 of the cabin frame 20 is formed by bending a steel pipe in a shape substantially resembling the letter U and has the upper section 22b and a pair of vertical members 22a extending vertically downward from the opposite ends of the upper section 22b. The lower ends of the vertical members 22a are joined to the body frame 10 by joints 26 shown in FIG. 1. Each joint 26 is formed in a bent shape and has a horizontal joining surface 26a and a joining surface 26b facing down. The two surfaces 26a, 26b of the joint 26 is applied and fastened to a rear portion of the body frame 10 with bolts 26x. Since the two surfaces 26a and 26b, which are not parallel to each other, are applied and fastened to the body frame 10, the rear portion 22 of the cabin frame 20 are joined firmly to the body frame 10. As shown in FIGS. 1 and 4, crossbars 27 and 28 are welded to middle portions of the two vertical members 22a of the rear portion 22 to provide the rear portion 22 with sufficiently high rigidity to withstand lateral forces that may act on the body of the four-wheeled utility vehicle. As shown in FIGS. 1, 3 and 4, guard rails 22f are attached to the vertical members 22a of the rear portion 22 on the level of the driver's seat 4.

As shown in FIG. 1, the load-carrying platform 30 mounted on a rear portion of the body frame 10 has a horizontal deck 31 for supporting cargo thereon, side plates 32 extended along the right and the left side of the deck 31, a front plate 33 extended along the front side of the deck 31 and a swingable gate 34. A rear portion of the deck 31 is attached to the body frame 10 via a support shaft 35 so that the load-carrying platform 30 can be turned on the support shaft 35 for tilting. Handles 36 are attached to front right and front left portions of the load-carrying platform 30. The user of the four-wheeled utility vehicle holds the handle 36 to tilt the load-carrying platform 30. The load-carrying platform 30 is retained at a normal position shown in FIG. 1, i.e., a position where the load-carrying platform 30 is kept while the four-wheeled utility vehicle is traveling, by fastening devices 37. The fastening devices 37 fasten the front portion of the load-carrying platform 30 to the body frame 10 to retain the load-carrying platform 30 at the normal position. The fastening devices 37 can be easily unfastened by hand. When tilting the load-carrying platform 30 by turning the same on the support shaft 35 for the maintenance of the engine and the devices disposed in the space 6 under the load-carrying platform 30, the fastening devices 37 are unfastened, the handle 36 is gripped to turn the load-carrying platform 30 upward on the support shaft 35. After the completion of maintenance, the handle 36 is gripped to turn the load-carrying platform 30 downward to the normal position on the body frame 10, and the load-carrying platform 30 is retained in place by the fastening devices 37.

In the four-wheeled utility vehicle shown in FIG. 1, the rear portion 22 of the cabin frame 20 is bound down by the load-carrying platform 30 to enhance effectively the rigidity of the cabin frame 20 resisting particularly back-and-forth load on the cabin frame 20. As shown in FIGS. 3 and 4, hooking members 38 each having an eye opening downward are attached to front end portions of the load-carrying platform 30. When the load-carrying platform 30 is turned downward on the support shaft 35 toward the normal position shown in FIG. 1, the hooking members 38 are brought from above into engagement with the crossbar 28 to restrain the crossbar 28 from back-and-forth and upward movement. When the hooking members 38 are thus engaged with the crossbar 28, a back-and-forth external force exerted on the cabin frame 20 is transmitted to the load-carrying platform 30. Since the load-carrying platform 30 is fixedly held at the normal position on the body frame 10 by the support shaft 35 and the fastening devices 37, the deformation of the cabin frame 20 by the back-and-forth external force can be effectively prevented by the load-carrying platform 30.

As shown in FIGS. 3 and 4, the hooking members 38 have seizing portions and base portions 38a, respectively, and the base portions 38a are welded to right and left end portions of the front plate 33, respectively. The base portion 38a of each hooking member 38 is welded to a portion of the load-carrying platform 30 including the front plate 33 and a portion of a square pipe 32a set at the joint of the front plate 33 and the side plate 32. This portion of the load-carrying platform 30, as compared with other portions of the same, is relatively difficult to deform by load. Since the hooking members 38 has the eyes opening downward as shown in FIG. 4, the hooking members 38 can be separated from the crossbar 28 when the front end portion of the load-carrying platform 30 is turned upward and can be brought from above into engagement with the crossbar 28 when the front end portion of the load-carrying platform 30 is turned downward to the normal position. The crossbar 28 and the hooking members 38 are formed in dimensions and positioned such that a uniform clearance of about 1 mm to 10 mm, typically 5 mm, is formed between the crossbar 38 and each hooking member 38 in a state where the load-carrying platform is placed at the normal position with the hooking members 38 hanging over the crossbar 28. If the cabin frame 20 is deformed slightly by a back-and-forth load exerted thereon, the crossbar 28 comes into contact with the hooking members 38 and is restrained from further movement. The cabin frame 20 can be deformed only slightly in a small range corresponding to the clearance between the crossbar 28 and each hooking member 38 before the crossbar 28 comes into contact with the hooking members 38 and cannot be deformed to an extent that causes plastic deformation. Therefore, the cabin frame 20 returns elastically to its original shape upon the removal of the load therefrom. Since the clearance is formed between the crossbar 28 and each hooking member 38, the load-carrying platform 30 can be smoothly turned upward and downward. Thus, the rigidity of the cabin frame 20 resisting back-and-forth force can be greatly enhanced simply by providing the load-carrying platform 30 with the hooking members 38, i.e., small parts capable of being easily formed, and any special operation is not necessary in using the hooking members 38. Although the size of the clearance in this embodiment is about 5 mm, the size of the clearance is not limited thereto and may be any value provided that the deformation of the cabin frame 20 can be prevented and the load-carrying platform 30 can be smoothly turned upward and downward.

A cushioning members 39 are provided on the surface of the crossbar 28 in the regions with which the hooking members 38 may be engaged. The cushioning members 39 are made of elastic materials, etc. Generation of noise can be prevented by the cushioning members 39 which are interposed between the crossbar 28 and the hooking members 38.

Figure 5:
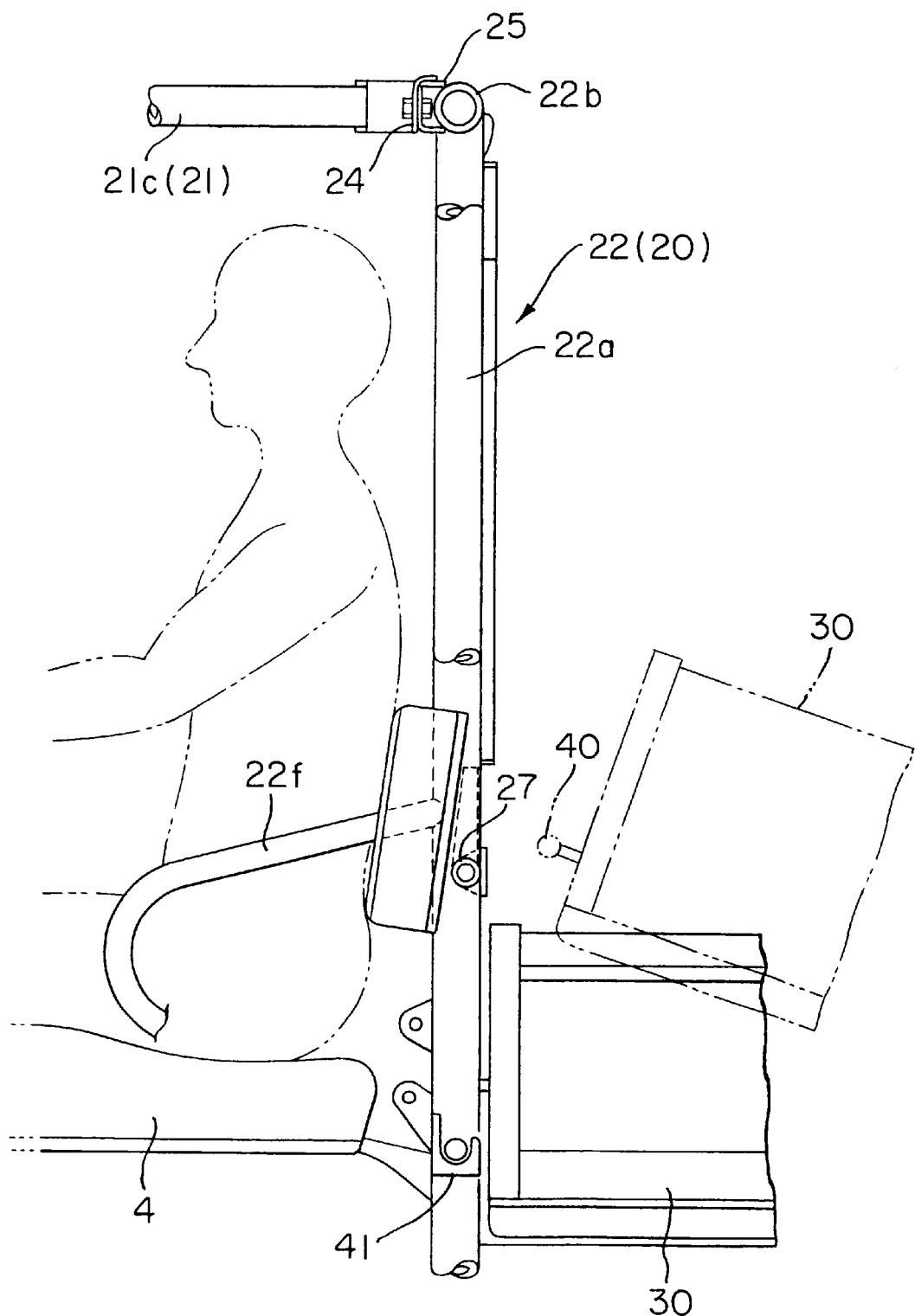
FIG. 5 is a side elevation of the cross bar, the hooking member and circumference thereof of a modification of the four-wheeled utility vehicle shown in FIGS. 1 to 4.

The four-wheeled utility vehicle in the embodiment shown in FIGS. 1 to 4 may be subject to modification. In one modification, as shown in FIG. 5, a horizontal bar 40 is attached to the front end portion of the load-carrying platform 30. A hooking members 41 are attached to the right and left end portions of the rear portion 22 of the cabin frame 20. Each of the hooking member 41 has an eye opening which is opened upward. In this modification, the rear portion 22 of the cabin frame 20 is restrained from free movement by the horizontal bar 40 with which the hooking members 41 are engaged when the front end portion of the load-carrying platform 30 is placed at its normal position.

In another modification, hooking members disposed at upper region of the front end portion of the load-carrying platform 30 may be brought into engagement with the crossbar 27 disposed above the crossbar 28 to bind down the cabin frame 20 by the load-carrying platform 30. Lower end portions of the cabin frame 20 may be connected to the body frame 10 by any other suitable methods and the front portion 21 of the cabin frame 20 may be formed in any suitable shape other than that shown in FIGS. 1 and 2.

Although the invention has been described in its preferred embodiment with a certain degree of particularity, obviously many changes and variations are possible therein. It is therefore to be understood that the present invention may be practiced otherwise than as specifically described herein without departing from the scope and spirit thereof.

What is claimed is:

1. A four-wheeled utility vehicle comprising:
   a body frame;
   a driver's seat disposed on the body frame;
   a load-carrying platform having a front end portion and a rear end portion, the load-carrying platform being disposed behind the driver's seat;
   a cabin frame having a rear portion and surrounding the driver's seat, the cabin frame being disposed in front of the load-carrying platform, the rear portion of the cabin frame including a lower end which is positioned on a level below the load-carrying platform and a middle portion which is located on a middle level in a vertical direction within the rear portion, the lower end of the rear portion being joined to the body frame, and the middle portion of the rear portion being bound by the front end portion of the load-carrying platform in an easily separable manner.

2. The four-wheeled utility vehicle according to claim 1, wherein the rear portion of the cabin frame has a plurality of vertical members and a horizontal crossbar by which the vertical members are connected;
   wherein the load-carrying platform can be turned such that the front end portion of the load-carrying platform is raised relative to the rear end portion of the load-carrying platform;

wherein the load-carrying platform is provided with a hooking member at the front end portion of the load-carrying platform, the hooking member having an eye opening which is opened downward; and wherein the rear portion of the cabin frame is restrained from free movement by the hooking member which is hooked over the crossbar when the front end portion of the load-carrying platform is placed at its normal position.

3. The four-wheeled utility vehicle according to claim 2, wherein the load-carrying platform having a pair of the hooking members which are attached to right and left end portions of the front end portion of the load-carrying platform, respectively.

4. The four-wheeled utility vehicle according to claim 2, wherein a small clearance is formed between an outer surface of the crossbar and a periphery of the eye opening when the front end portion of the load-carrying platform is placed at the normal position.

5. The four-wheeled utility vehicle according to claim 4, wherein a cushioning member is interposed between the crossbar and the hooking member.

6. The four-wheeled utility vehicle according to claim 1, wherein the load-carrying platform is provided with a horizontal bar at the front end portion of the load-carrying platform;

wherein the load-carrying platform can be turned such that the front end portion of the load-carrying platform is raised relative to the rear end portion of the load-carrying platform;

wherein the cabin frame is provided with a hooking member at the rear portion of the cabin frame, the hooking member having an eye opening which is opened upward; and wherein the rear portion of the cabin frame is restrained from free movement by the horizontal bar with which the hooking member is engaged when the front end portion of the load-carrying platform is placed at its normal position.

* * * * *